(No Model.)
2 Sheets—Sheet 2.
R. C. SMITH.
ELEVATOR.
No. 418,878. Patented Jan. 7, 1890.
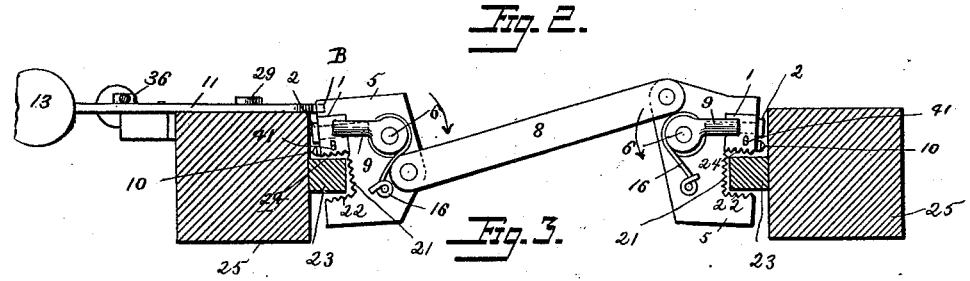
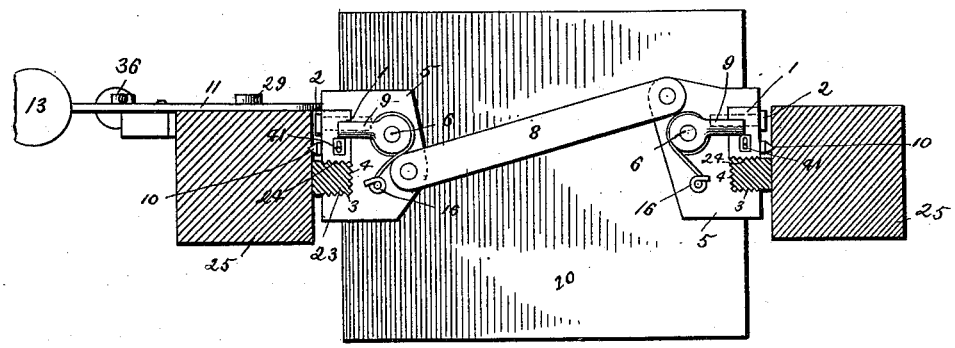
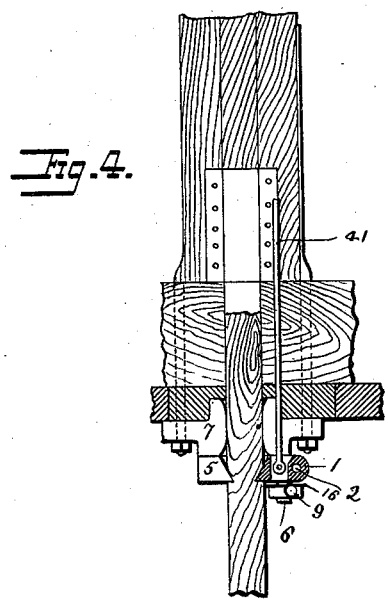
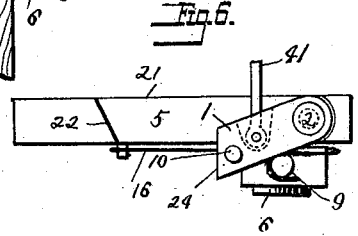
Witnesses
W. S. McArthur
S. E. Johnson
R. C. Smith
Inventor
By
Foster & Freeman
Attorneys
N. PETERS, Photo-Lithographer, Washington, D. C.

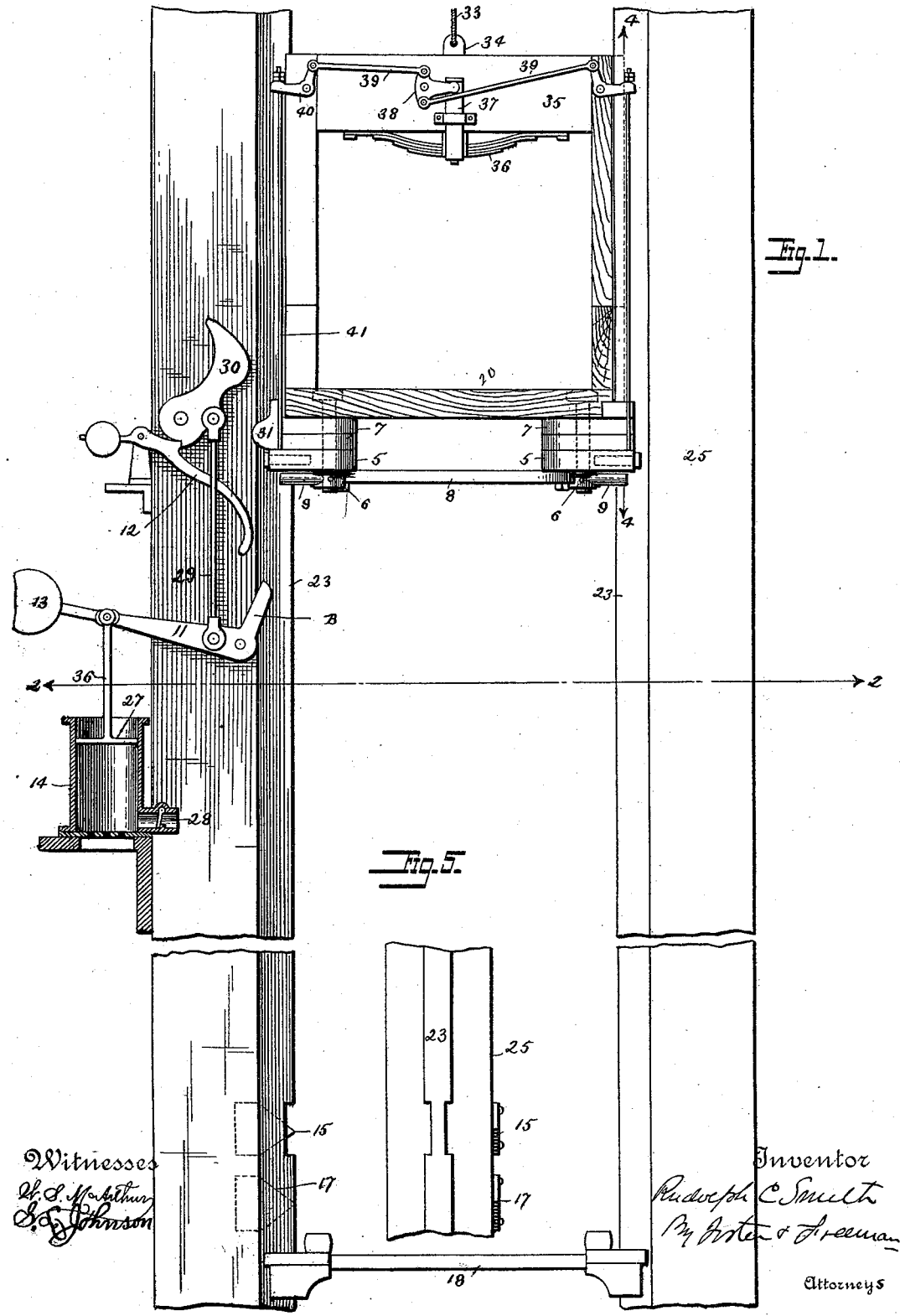

UNITED STATES PATENT OFFICE.

RUDOLPH C. SMITH, OF YONKERS, NEW YORK, ASSIGNOR TO OTIS BROTHERS & COMPANY, OF SAME PLACE.

ELEVATOR.

SPECIFICATION forming part of Letters Patent No. 418,878, dated January 7, 1890.

Application filed June 2, 1888. Renewed October 11, 1889. Serial No. 326,679. (No model.)

*To all whom it may concern:*

Be it known that I, RUDOLPH C. SMITH, of Yonkers, in the county of Westchester and State of New York, have invented a new and useful Improvement in Safety Devices used for Elevators, of which the following is a specification.

My invention consists of a safety device, fully described hereinafter, by which to gain greater efficiency in checking and arresting the too-rapid descending movement of an elevator-cage, and to effect this with such a resistance as will avoid any objectionable shock or jar.

In the accompanying drawings, Figure 1 is an elevation showing a cage in section in connection with cage-guides and my improved grip device and means for operating it on the breaking of the suspensory rope. Fig. 2 is an inverted sectional plan on the line 2 2, Fig. 1, showing the parts in normal position. Fig. 3 is the same as Fig. 2, showing the parts in a different position. Fig. 4 is a sectional elevation on the line 4 4, Fig. 1. Fig. 5 is an edge view of part of one of the guides. Fig. 6 is an enlarged elevation of the outer edge of plate 5 and its dog.

The main feature of my invention is a clamp or gripper connected movably with the cage or platform of an elevator and consisting of a gripping or biting plate having edges arranged to bite two of the faces of one of the elevator-guides and a movable dog carried by said plate and provided with an edge to engage the other face of the said guide.

The gripper-plate 5 may be pivoted to the bottom 20 of the cage or platform, as shown in Figs. 1 to 4. In either case the plate 5 is notched or cut away to form two edges 21 22, which edges may be plain or serrated, according to the character of the elevator-guide 23 with which they are to engage, and the dog 1 is connected movably to the gripping-plate. For instance, it is pivoted by a pin 2 in position for its edge 24 to occupy a position parallel to the edge 22 of the gripping-plate.

In the construction shown in Figs. 1 to 4 the gripping-plate 5 is pivoted by a pivot-pin 6 to one of the guide-shoes 7 below the latter in such position that the adjacent guide 23 may extend into the notch or recess formed by the edges 21 22 of the gripping-plate and the edge 24 of the gripping-dog; but when the gripping-plate is swung inward to the position shown in Fig. 2 and the dog is in a position with its edge away from the guide the cage or platform 20 can move freely up and down between its guides. When, however, the gripping or biting edges 21, 22, and 24 are brought forcibly against the faces of the guide, they will penetrate the latter, and any further descent of the cage or platform will cause the guide to be cut away until the resistance to the downward movement of the cage becomes so great as to cause its final and gradual arrest.

Different means may be employed for causing the gripping-edges to penetrate or bite the guide upon any improper increase in the speed of the movement of the cage. Thus, when the plate is pivoted to the platform of the cage, if the biting-edge of the dog be brought in contact with the adjacent face of the guide as the cage descends, the resistance to the further downward movement of the end of the dog will tend to carry it to a horizontal position, causing it to react on and thereby swing the plate upon its pivot 6 in the direction of the arrow, Fig. 2, until the parts are in the position shown in Figs. 3 and 4; the edges 21 and 22 of the gripping-plate being thus brought against the corresponding faces of the guide and penetrating the latter, as shown in Figs. 3 and 4, so that any further descent of the cage can only be effected by cutting away all the faces of the guide, which results in such a resistance as speedily arrests the movement of the cage.

The turning of the gripping-plate may automatically bring the dog into position to engage with the face of the guide. Thus the dog may have a lateral pointed pin or projection 10, normally out of contact with any stationary part of the apparatus, but which, when the plate is turned in the direction of the arrow, Fig. 2, will be caused to penetrate the face of the adjacent guide-support 25, tending to arrest the downward movement of the gripping end of the dog, and thereby bringing it toward a horizontal position and throwing its edge into contact with the adjacent guide-plate, as shown in Fig. 3.

The initial movement of the plate 5 necessary to bring the lug 10 into contact with the stationary face may be effected by any of the various elevator governor or controlling apparatus in a manner which will be obvious to any skilled mechanic—as, for instance, a cam B is arranged to strike and swing the plate, said cam being controlled in its action by the speed of the cage. Thus the said cam B may be the projecting end of a lever 11, pivoted to the side of the guide-support 25 and normally in position to strike the edge of the plate 5 as the cage descends, as shown in Figs. 2 and 3, and to thereby swing the plate in the direction of its arrow. In order that the said cam may be removed from position to effect the movement of the gripping-plate and the arrest of the cage when the speed of the latter is not excessive, I employ a governor, by which it is controlled. Thus the outer end of the cam-lever 11 is weighted and connected by a rod 36 with the piston 27 of a dash-pot 14, having a perforated bottom and freely-opening inlet-valve 28, and the cam-lever 11 is also connected by a rod 29 with a lever 30, having a shoulder engaging with that of a catch-lever 12, the inner end of which is in position to contact with a projection 31 upon the cage or platform, the outer end being weighted to normally maintain this position.

When the cage descends at its ordinary rate of speed, the projection 31 deflects the catch-lever 12, releases the retaining-lever 30, and the weighted end of the cam-lever 11 descends, so that the cam end of said lever passes from position to contact with the plate 5; but when the movement of the cage is too rapid for safety the dash-pot prevents the cam-lever from moving quickly enough to avoid contact with the plate 5, and the latter will be swung upon its pivot and the guide will be gripped. Upon the upward movement of the cage the projection 31 will strike the end of the lever 30 and restore the parts to their normal position. (Shown in Fig. 1.)

When two grippers are employed, as shown in Figs. 1, 2, and 3, they are connected by a connecting-rod 8, so that the movement of either in a direction to grip the guide will impart a corresponding movement to the other.

It is desirable in case of the breaking of the elevator-cable to insure the immediate arrest of the cage before it acquires any excessive rate of movement, and to effect this I connect the gripping-dog with a spring or weight, which is brought into operation to lift the dog the instant that the tension of the cable is released. Thus the cable 33 is connected with a sliding bar 34, passing through the cross-bar 35 of the cage and secured at its lower end to a stiff spring 36, which will be normally flattened against the bar by the weight of the cage when the latter is suspended within the well, and this spring is connected with each of the dogs, so as to lift the latter when the spring moves outward, which would result if the elevator-cable should break. The particular connection shown consists of a slide 37, carried by the cross-bar 35 and bearing upon a T-lever 38, the vertical arms of which are connected by rods 39 to bell-crank levers 40, and the outer arm of each of the latter is connected by a rod 41 with the dog below. With each gripper is combined a spring 16, connected at one end to the pin 6 and at the other to the gripping-plate, and which tends to keep the gripping-plate in the normal position. (Shown in Fig. 2.)

To prevent the gripping-plate from sticking to its pivot-pin by grit or corrosion, I place a cam 15 adjacent to the path of the gripping-plate, securing it, for instance, to the guide-support, as shown in Fig. 5, so as to strike the plate and compel it to swing to a slight extent, and I cut away enough of the guide adjacent to said cam to prevent the guide from being gripped as the result of the swinging of the plate at this point; but should the car descend with great rapidity the plate 5 will not have time to swing back to its normal position after passing beyond the cut-away portion of the guide, and the latter will be gripped and the car will be arrested, as before described, the stationary cam in this case acting in like manner as the movable cam before described.

In order to effect the lifting of the dog and engage it with the guide when the plate 5 is turned by the cam, or otherwise, the pivot-pin 6 supports a laterally-projecting finger 9 in position below the dog to be struck thereby and lift the dog when the plate 5 is swung in the direction of the arrow, Fig. 2. The finger 9 is stationary with respect to the plate 5, and hence in the normal position of the latter (shown in Figs. 2 and 6) is sufficiently at one side of the dog 1 to permit said dog to fall away from the guide 23; but when the plate 5 is moved to bring its gripping-faces into contact with the guide the dog 1 will contact with the finger 9 and be raised into its operative position.

The gripping-dog may be hung loosely in any suitable manner to the plate 5, and I do not limit myself to the pivotal connection shown.

Without limiting myself to the precise construction and arrangement of parts shown, I claim—

1. In combination with the cage or platform and guide of an elevator, a safety-gripper consisting of a plate connected movably with the cage and having edges arranged to engage two faces of the guide, and a dog hung to the plate with its edge in position to engage the other face of the guide, substantially as described.

2. The combination, with a cage and guide, of a movable plate having edges arranged to engage two faces of the guide, a dog hung to said plate to engage the remaining face of the guide, and a spring connected with the suspensory cable and also with the dog, whereby the latter is raised on the releasing of the spring by the breaking of the cable, substantially as described.

3. The combination, with the car and guide, of a pivoted plate with two edges to engage two guide-faces and a dog hung to said plate to engage the other face of the guide, substantially as described.

4. The combination, with the cage and guide of an elevator, of a pivoted grip-plate and dog hung to the latter, and a cam arranged adjacent to the guide to engage and swing the plate, substantially as described.

5. The combination, with the cage, guide, pivoted grip-plate, and dog, of a pivoted cam-lever, dash-pot controlling the speed of vibration of said lever, catch connected with said lever, retaining-lever engaging with the catch, and a contact-piece on the cage for engaging with the retaining-lever, substantially as set forth.

6. The combination, with the cage, guide, pivoted catch-plate, and dog, of a fixed cam 15, arranged to be struck by and swing the plate, substantially as described.

7. The combination, with the pivoted plate having the biting-edges 21 22, of a pivot-pin 6, having a finger 9, and a biting-dog loosely connected to said plate in position to strike the pin when the plate is turned, substantially as described.

RUDOLPH C. SMITH.

Witnesses:
J. R. SEWERIA,
WILLIAM MOLLOY.